June 22, 1954  M. N. FAIRBANK  2,681,602
PHOTOGRAPHIC APPARATUS
Filed May 23, 1951  6 Sheets-Sheet 1

INVENTOR
Murry N. Fairbank
BY
Brown and Mikulka
ATTORNEYS

June 22, 1954  M. N. FAIRBANK  2,681,602
PHOTOGRAPHIC APPARATUS
Filed May 23, 1951  6 Sheets-Sheet 4

INVENTOR
Murry N. Fairbank
BY
Brown and Mikulka
ATTORNEYS

June 22, 1954     M. N. FAIRBANK     2,681,602
PHOTOGRAPHIC APPARATUS

Filed May 23, 1951                                6 Sheets-Sheet 5

INVENTOR
Murry N. Fairbank
BY
Brown and Mikulka
ATTORNEYS

June 22, 1954   M. N. FAIRBANK   2,681,602
PHOTOGRAPHIC APPARATUS
Filed May 23, 1951   6 Sheets-Sheet 6

INVENTOR
Murry N. Fairbank
BY
Brown and Mikulka
ATTORNEYS

Patented June 22, 1954

2,681,602

UNITED STATES PATENT OFFICE 2,681,602

PHOTOGRAPHIC APPARATUS

Murry N. Fairbank, Belmont, Mass., assignor to Polaroid Corporation, Cambridge, Mass., a corporation of Delaware Application May 23, 1951, Serial No. 227,824

19 Claims. (Cl. 95—13)

This invention relates to photography and more particularly to novel photographic apparatus.

An object of the present invention is to provide a camera having a lens fixed in position with respect to the image-receiving area of a sheet of photosensitive material positioned for exposure within said camera.

Another object of the present invention is to provide a camera having a removable magazine which carries both a sheet of photosensitive material and means for developing said sheet within said camera.

Still another object of the present invention is to provide a camera wherein the image-receiving area of a first sheet of photosensitive material is developed and the image transferred to a second sheet within said camera by superposing said sheets and passing said sheets between a pair of pressure-applying means having novel orientation and location.

A further object of the present invention is to provide a camera of the above type having combined means for closing a passage in the housing of said camera, which passage provides access to the interior of said housing, and for actuating said pressure-applying means.

A still further object of the present invention is to provide a camera of the above type having simplified and economical construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The camera herein disclosed comprises means for holding a first sheet of photosensitive material, said first sheet comprising a silver halide layer, means for exposing an image-receiving area of said first sheet and means for processing said image-receiving area within said camera, said processing being accomplished by the spreading of a processing liquid between said image-receiving area and a second sheet also positioned within said camera. The processing liquid may comprise a developer, a silver halide solvent, an alkali and a viscosity-increasing, film-forming material such as an alkali-inert polymer. Preferably, the processing liquid forms a transfer print upon an image-receiving area of said second sheet, which area corresponds to the image-receiving area of said first sheet. The second sheet preferably supports a plurality of processing liquid containers at spaced intervals on one surface thereof to provide the processing liquid to be spread between the sheets. This surface is brought substantially into contact with a surface of said first sheet and the two superposed sheets are passed between a pair of pressure-applying members to cause the release and spreading of the processing liquid. The result of this procedure is to develop the latent image on the image-receiving area of the first photosensitive sheet to silver and to form on said image-receiving area a soluble silver complex from unexposed silver halide for transfer to said second sheet. This complex, at least in part, may be transferred, by imbibition, to the image-receiving area of the second sheet where it may be developed to silver to provide a positive image, if desired.

The photographic process and various species of first and second sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of first or second sheets, the terms "first sheet" and "second sheet" being used in their broadest sense to indicate a first sheet which is photosensitive and a second sheet which merely may aid in spreading the processing liquid over the surface of the first sheet or which may, if desired, possess other characteristics.

Figure 1:
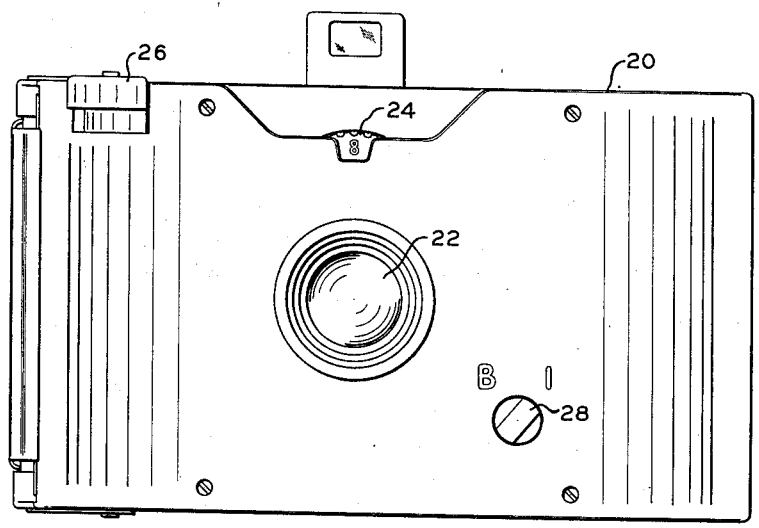
Figure 1 is a front elevation of a camera embodying a preferred form of the present invention.

The camera shown in Fig. 1 constitutes one preferred embodiment of the present invention. Generally, this camera includes a housing, the front of which mounts a lens, a shutter mechanism and various shutter controls, and the back of which is provided with a passage. A magazine, adapted to hold rolls of first and second sheets of the kind mentioned above, is normally enclosed within said housing and may be removed from said housing via said passage in the back of said housing. Two closure means are pivoted to the back of the housing. The inner closure means substantially closes the passage in the back of said housing and permits sheets from within the housing to emerge from said housing between the free end of said inner closure means and the adjacent housing wall. The outer closure means and the inner closure means, when in closed position, define a dark chamber through which first and second sheets, which have been superposed and which have emerged from within the housing, may be drawn before leaving the inner recesses of the camera entirely.

The preferred camera of Fig. 1 includes a housing 20, the forward portion of which mounts lens 22, a shutter mechanism (not shown) and adjusting dial 24 for setting the speed and aperture size of the shutter mechanism. A control button 26, which actuates the shutter mechanism, is positioned at a corner of housing 20 (Fig. 2), said button being shaped to form smooth continuations of the front, side and top surfaces of housing 20, as viewed in Figs. 1 and 2. Knob 28 sets the shutter mechanism for "bulb" or "instantaneous" exposure. Patent No. 2,531,936, issued to Murry N. Fairbank and Sidney B. Whittier on November 28, 1950, for Camera Shutter Mechanism, discloses a shutter mechanism of preferred form that may be incorporated in the camera herein disclosed.

Figure 2:
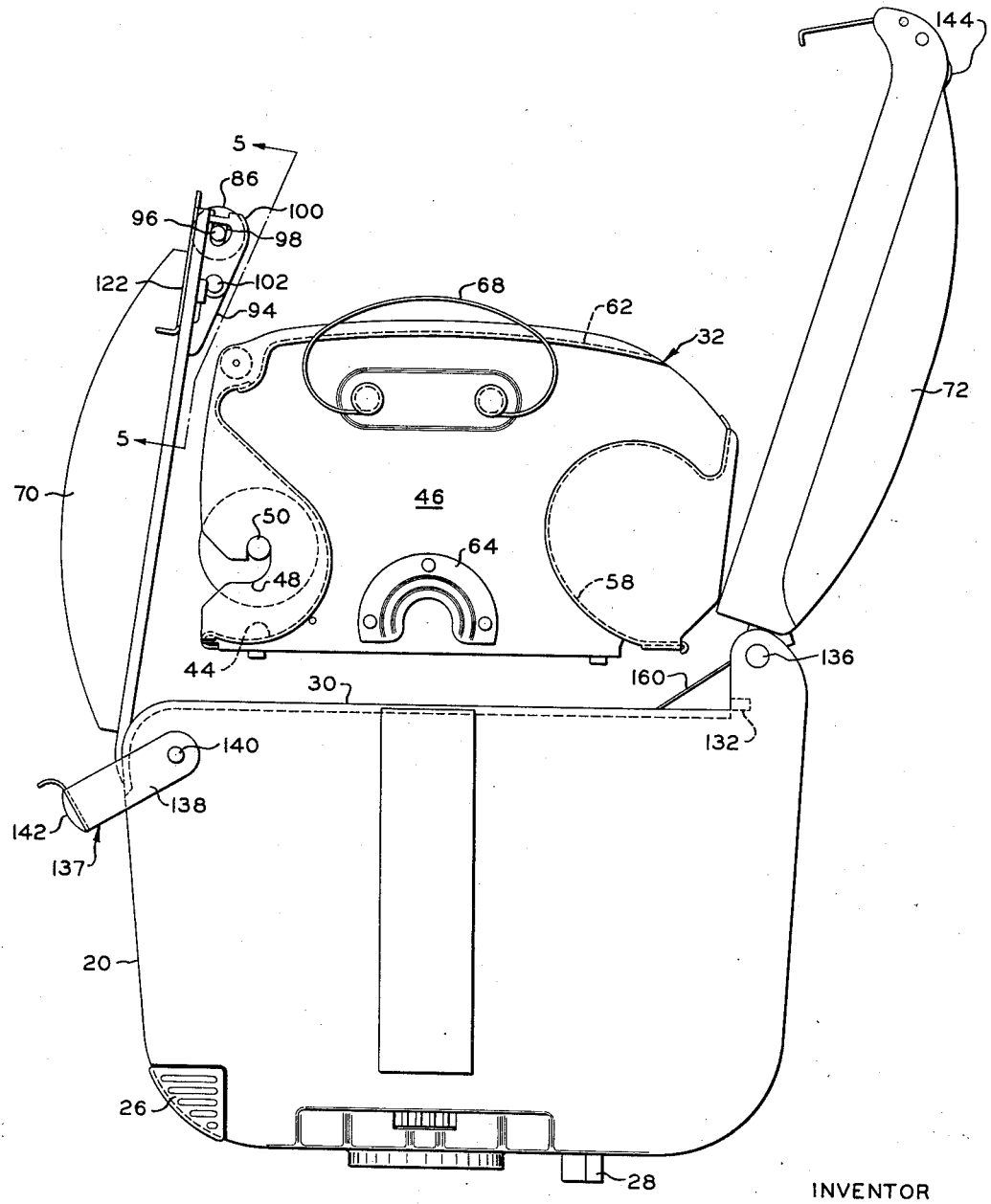
Fig. 2 is a plan view of the camera of Fig. 1, in open position, with the roll-carrying magazine removed from within the camera housing.
Figure 3:
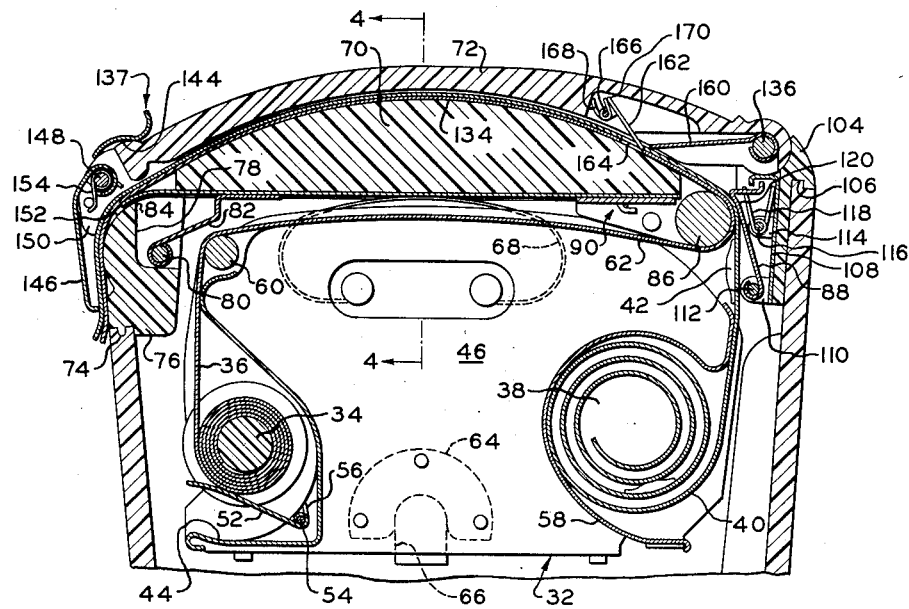
Fig. 3 is a sectional view taken along a line substantially midway between the top and bottom of the camera of Fig. 2, said camera being in closed position, with parts thereof not shown and parts thereof broken away.

The back of housing 20 provides a passage 30 through which roll-holding magazine 32 may be moved into position within the housing 20 (Figs. 2 and 3). Magazine 32 is adapted to support a first roll 34, which comprises a first sheet 36 of photosensitive material, and a second roll 38, which comprises a second sheet 40. Second sheet 40 carries a plurality of processing liquid containers 42. The first roll 34 is supported in compartment 44, the upper and lower plates 46 of magazine 32 forming the top and bottom walls of compartment 44 and being provided with curved slots 48 (Fig. 2) which are adapted to retain shafts 50 of first roll 34 in fixed position in magazine 32. First roll 34 is retained in compartment 44 by plate 52 which is rotatably supported on pin 54 and is urged into contact with said first roll 34 by means of spring 56, a portion of which is shown in Fig. 3. Second roll 38 is supported in compartment 58, which is curved as shown in Fig. 3, this curvature alone serving to retain said second roll 38 in compartment 58. It is to be noted that compartment 44 is smaller in cross-sectional area than is compartment 58, this being so for the reason that first roll 34, which is adapted to be contained in compartment 44, is less bulky than is second roll 38, which is adapted to be contained in compartment 58.

First sheet 36 comprises a plurality of image-receiving areas that are adapted to be positioned for exposure substantially in the focal surface of lens 22. First sheet 36 is adapted to extend from first roll 34 to the rear of magazine 32, as viewed in Fig. 3. First sheet 36 is positioned for exposure at the rear of magazine 32 by means of roller 60 which is substantially tangent to the focal surface of lens 22 when the magazine 32 is in proper operating position within the housing 20. First sheet 36 is positioned for exposure, also, by means of guide surfaces 62 (Fig. 2) on the upper and lower plates 46, which lie substantially in said focal surface. Compartments 44 and 58 and upper and lower plates 46 define a chamber which is open at its forward and rearward ends to provide, when magazine 32 is in proper operating position within housing 20, an optical path between lens 22 and the focal surface of said lens.

The magazine 32 is properly positioned within the housing 20 by means of bosses 64 on the upper and lower plates 46 which coact with lugs 66 on the top and bottom walls of the housing 20, one of which is shown in dotted lines in Fig. 3, and is secured in position by means of leaf springs 68, mounted on the upper and lower plates 46, which abut against inner closure means 70, now to be described.

Inner closure means 70 and outer closure means 72 act to close the passage 30 in the back of housing 20 after the magazine 32 has been inserted within said housing 20 and to provide a dark chamber between their adjacent surfaces for the reception of first and second sheets that have been superposed and are being processed for a short predetermined time. The open and closed positions of inner closure means 70 are shown in Figs. 2 and 3, respectively. Attached to a side of housing 20, as at 74, is a corner block 76, which pivotally supports the inner closure means 70 and braces the housing 20, a corner block distinct from the remainder of housing 20 being desirable by reason of the injection molding requirements of the remainder of the housing. Corner block 76 has a cut-out portion 78 for the reception of hinge pin 80 and bracket 82, the hinge pin 80 being secured at its ends to corner block 76. Bracket 82 is journaled on hinge pin 80 and supports inner closure means 70 which, therefore, is rotatable about hinge pin 80. Corner block 76 and the pivoted end of inner closure means 70 curve in complementary manner as at 84, this curvature serving both to permit rotation of the inner closure means 70 with respect to corner block 76 and to insure lighttightness of the housing 20 when the inner closure means 70 is in closed position.

Figure 5:
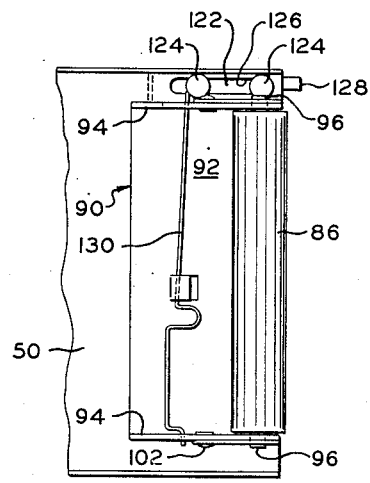
Fig. 5 is a plan view of the inner closure means and first pressure member shown in Fig. 2, taken substantially along the line 5—5.

Pressure members 86 and 88 are adapted to exert pressure on opposite sides of superposed first and second sheets extending from the first and second rolls, respectively, to rupture the processing liquid container 42 and to spread the processing liquid between said first and second sheets. First pressure member or roller 86 is positioned at the free end of inner closure means 70 and is in operative juxtaposition with second pressure member or plate 88, mounted on a side of camera housing 20, when inner closure means 70 is in closed position. Pressure member 86 is mounted on cradle 90 (Fig. 5), which comprises yoke 92 and flanges 94, the yoke 92 being suitably attached to inner closure means 70. Pressure member 86 is trunnioned on flanges 94, the bosses 96 of pressure member 86 being rotatable in slots 98 (Fig. 2). Hooks 100, pivoted on rivets 102, lock bosses 96 in position at the inner ends of slots 98.

Pressure member 88 is carried by corner block 104 and is normally yieldably urged against pressure member 86. Corner block 104 is attached to a side of housing 20, as at 106, being distinct from the remainder of housing 20 for the reason stated in connection with corner block 76. Corner block 104 mounts support plate 108 which, in turn, supports pressure member 88 and means for biasing said pressure member 88 against pressure member 86. Struck out lugs 110, one of which is shown in Fig. 3, on support plate 108, mount shaft 112, which rotatably supports pressure member 88. Struck out lugs 114, one of which is shown in Fig. 3, on support plate 108, mount shaft 116, on which is mounted spring 118. Pressure member 88 is biased away from the wall of housing 20 by spring 118, one leg of which rests against the surface of support plate 108 and the other leg of which is inserted into an opening in pressure member 88. Pressure member 88 is curved as shown at 120 (Fig. 3) so that it contacts pressure member 86 along an area which is farther toward the rear of housing 20 than is the axis of rotation of pressure member 86. It is to be noted that pressure member 88 and pressure member 86 lie substantially on opposite sides of a plane which is substantially perpendicular to the focal surface of the lens 22. The configuration of pressure member 88 and its position of contact with pressure member 86, in effect, furnish a curved passage from the interior of housing 20 to the dark chamber formed between said inner and outer closure means, a gradual rather than an abrupt change in the direction of travel of the superposed sheets being necessary to prevent disturbance of the contact between said sheets. In the present embodiment, pressure member 86 comprises a roller and pressure member 88 comprises a curved plate. However, it is apparent that other forms of pressure members may be substituted for the pressure members 86 and 88 herein described. For example, the positions of the pressure members may be reversed or, alternatively, two pressure rollers or two pressure plates may be advantageously used.

Latch 122 (Figs. 2 and 5), mounted at one edge of the free end of inner closure means 70, locks said inner closure means in closed position with pressure member 86 in operative juxtaposition to pressure member 88 to exert pressure on superposed first and second sheets being drawn therebetween. Latch 122 is slidably guided along an edge of inner closure means 70 by pins 124 extending from latch 122 through slot 126 in inner closure means 70. Tongue 128 of latch 122 is urged by spring 130 into engagement with notch 132 (shown in dotted lines in Fig. 2) in corner block 104.

The rear portion of inner closure means 70 comprises a guide surface 134 which is concavely curved with respect to housing 20 and which is adapted to guide superposed first and second sheets which have emerged between the pressure members 86 and 88 from within housing 20. The configuration of the pressure member 88 and its position of contact with the pressure member 86 tend to give the superposed first and second sheets a curvature which is concave with respect to housing 20, pressure members 86 and 88, as stated above, in effect providing a curved passage for said superposed first and second sheets. The guide surface 134 is a continuation of the curved passage provided by said pressure members 86 and 88, continued curvature being necessary to prevent disturbance of the contact between the superposed first and second sheets inasmuch as any such disturbance would tend to blur a developing image.

The inner surface of outer closure means 72 is substantially of the same curvature as is rear portion 134 of inner closure means 70 and, when in closed position, forms with the guide surface 134 a dark chamber through which superposed first and second sheets, which have emerged from within housing 20, may be drawn before leaving the inner recesses of the camera entirely. The dark chamber between said inner and outer closure means is necessary to protect the superposed negative and positive sheets from actinic radiation during the short processing period following passage of said superposed sheets between pressure members 86 and 88. The outer closure means 72 is pivoted to corner block 104 by means of hinge pin 136, both ends of which are secured to said corner block 104.

The outer closure means 72 is locked in closed position by means of a channel-shaped clamp 137 (Figs. 2 and 3), the flanges 138 of which are pivoted on hinge pin 140 and the yoke 142 of which is resilient, said resilient yoke 142 being adapted to snap over thickened portion 144 of outer closure member 72.

Cutter blade 146 is mounted at the free end of outer closure means 72 so that portions of first and second sheets 36 and 40, which have been drawn from the dark chamber between the inner and outer closure means 70 and 72, may be severed by the operator from the portions of said first and second sheets remaining within said dark chamber. Cutter blade 146 is rotatably mounted on hinge pin 148 which, in turn, is secured at its ends to lugs 150 (one of which is shown in Fig. 3) forming extensions of outer closure means 72 and being curved, as at 152, curvature 152 being a continuation of the aforementioned curvature 84. The free end of cutter blade 146 is urged toward the side of housing 20 by means of two springs 154, which are positioned at opposite ends of hinge pin 148, one spring 154 being shown in Fig. 3.

Figure 4:
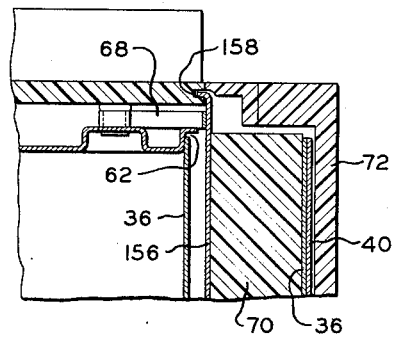
Fig. 4 is a sectional view of Fig. 3 taken substantially along the line 4—4.

Fig. 4 illustrates the means by which the inner closure means 70 insures lighttightness of the housing 20 although the outer closure means 72 is in open position, said lighttightness being accomplished primarily by sheet metal member 156, which forms a portion of inner closure means 70 and which provides flanges that fit into grooves 158 in the top and bottom walls of housing 20 when the inner closure means 70 is closed.

After the image-receiving area of first sheet 36 has been superposed on second sheet 40 and drawn between pressure members 86 and 88 and after said superposed sheets have remained in the dark chamber between said inner and outer closure means 70 and 72 for a predetermined processing time, outer closure means 72 is opened to provide access to said superposed first and second sheets. The developed image-receiving area of second sheet 40 is then ripped from the remainder of the second sheet, the ripping being aided by a line of perforations which separates the image-receiving area from the remainder of the second sheet, and, at the same time, is peeled from the image-receiving area of the first sheet. Plate 160 holds the superposed first and second sheets in position against the rear portion of inner closure means 70 while the image-receiving area of said first sheet is being separated from said first and second sheets. Plate 160 is rotatably supported by hinge pin 136 and is spring-urged toward the rear portion 134 of inner closure means 70, the spring not being shown for the purpose of clarity.

The exit of superposed first and second sheets, being drawn from the housing 20 between said inner and outer closure means 70 and 72, is interrupted by stop lugs 162 when an image-receiving area of first sheet 36 is positioned for exposure at the rear of magazine 32 substantially in the focal surface of lens 22, one said stop lug being shown in Fig. 3. Stop lugs 162 are adapted to mesh with apertures 164 at opposite edges of said first and second sheets. It is apparent that only one of the first and second sheets, if desired, may be provided with apertures at its opposite edges. Each stop lug 162 is rotatably mounted on a pin 166, the ends of which are secured to outer closure means 72, and is urged outwardly from outer closure means 72 by means of spring 168. Each lug 162 may be disengaged from apertures with which it has meshed merely by the opening of the outer closure means 72. When outer closure means 72 is in open position, rotation of stop lug 162 is halted by means of extension 170 which is adapted to abut against a surface of the outer closure means 72.

In operation of the preferred camera of Fig. 1, the inner and outer closure means 70 and 72 are swung open and the magazine 32 removed from within the camera housing 20. A first roll 34 is snapped into position in the compartment 44 and a second roll 38 is inserted into the compartment 58 (Fig. 3). The first sheet 36 is drawn from first roll 34 past roller 60 and into contact with guide surfaces 62 which position the first sheet in the focal surface of the camera. The first and second sheets 36 and 40 then are aligned and brought into contact, as shown in Fig. 3. The magazine 32 then is inserted into housing 20, the superposed first and second sheets being held by the operator adjacent the pressure member 88 and extending through the passage 30. Inner closure means 70 then is closed, the pressure member 86 now coacting with pressure member 88 to exert pressure on opposite sides of said superposed first and second sheets. The superposed first and second sheets then are drawn past guide surface 134, after which outer closure means 72 is rotated to closed position and locked by means of clamp 137. The superposed first and second sheets then are drawn from the dark chamber between said inner and outer closure means until stop lugs 162 mesh with apertures 164 at opposite edges of said first and second sheets. An image-receiving area of said first sheet is now in proper position for exposure. After exposure of said image-receiving area, the outer closure means 72 is opened to disengage stop lugs 162 from apertures 164. The superposed first and second sheets then are drawn slightly farther to prevent reengagement of stop lugs 162 with apertures 164 and the outer door is again closed and latched. The free ends of the superposed first and second sheets once again are drawn from the dark chamber between said inner and outer closure means until stop lugs 162 again mesh with apertures 164. During the drawing procedure, the passage of processing liquid container 42, between pressure members 86 and 88, increases the hydraulic pressure in said container 42 to the point where the processing liquid is forced out of the trailing edge of said container. As the drawing procedure continues, the liquid is spread between the superposed first and second sheets in a thin layer, the processing liquid acting to bond said first and second sheets together and to carry out the formation of a positive image on an image-receiving area of second sheet 40. After a predetermined processing time, the outer closure means 72 is opened, at which time the developed image-receiving area of second sheet 40 is ripped from the remainder of said second sheet, the ripping being aided by a line of perforations which separates the image-receiving area from the remainder of said second sheet and, at the same time, is peeled from the image-receiving area of said first sheet 36. As the process is continued, exposed and developed portions of said first and second sheets may be evenly severed from the remainder of said first and second sheets by means of cutter blade 146.

Figure 6:
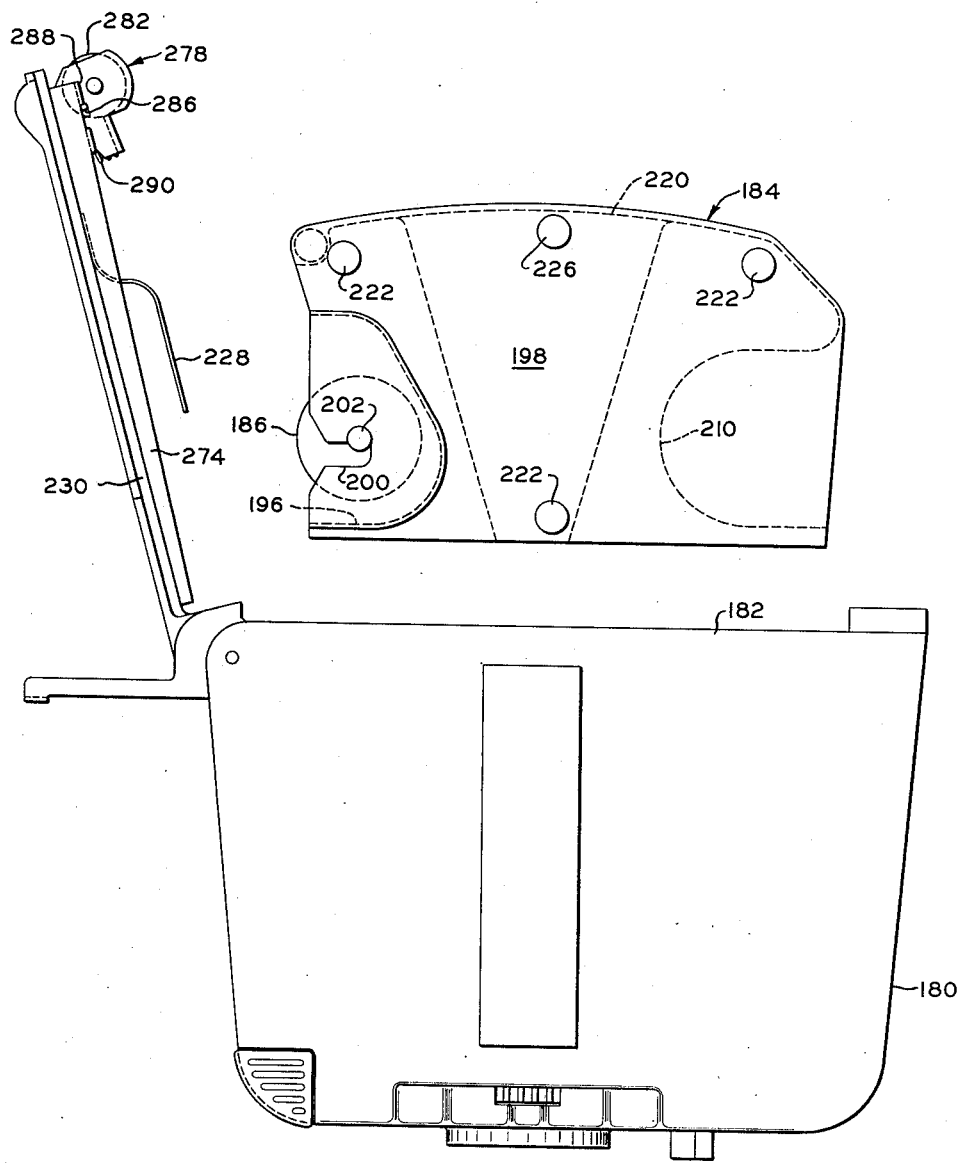
Fig. 6 is a plan view of a modification of the camera shown in Figs. 1-5, in open position, with the roll-carrying magazine removed from within the camera housing.

A modification of the camera of Figs. 1 through 5 is shown in Fig. 6. This modification is designed for use with first and second sheets having, on their nonadjacent surfaces, backing layers that are opaque to actinic radiation. Such opaque layers obviate the necessity for providing a dark chamber (similar to the dark chamber between the inner and outer closure means 70 and 72 of Fig. 2) for superposed first and second sheets that have been passed between the pressure members and are in the processing stage, the opaque backing layers, rather than a dark chamber, serving to protect the image-receiving areas of the first and second sheets from actinic radiation during the predetermined processing period following passage of said first and second sheets between said pressure members.

The camera of Fig. 6 comprises housing 180, the forward portion of which, like the forward portion of the camera of Fig. 1, mounts lens, shutter mechanism, adjusting dial, control button and knob. A front elevation of the camera of Fig. 6 is not shown but is generally similar to the front elevation of Fig. 1. The back of housing 180 provides a passage 182 through which magazine 184 may be inserted into proper position within housing 180.

Magazine 184 is adapted to carry a first roll 186, which comprises a first sheet of photosensitive material 188, and a second roll 190, which comprises a second sheet 192 that supports processing liquid containers 194. First sheet 188 and second sheet 192 have opaque backing layers which, as stated above, protect said first and second sheets from actinic radiation after they have been juxtaposed and have emerged from within housing 180.

First roll 186 is supported within compartment 196, upper and lower plates 198 of magazine 184 constituting the top and bottom walls of compartment 196 and being provided with curved slots 200 for the reception of shafts 202 on which first roll 186 is rotatable. First roll 186 is retained in compartment 196 by plate 204. Plate 204 is rotatably supported on retainer pin 206, the ends of which are secured to said upper and lower plates 198. Plate 204 is urged into contact with the negative roll by means of spring 208, also mounted on said retainer pin 206.

Figure 7:
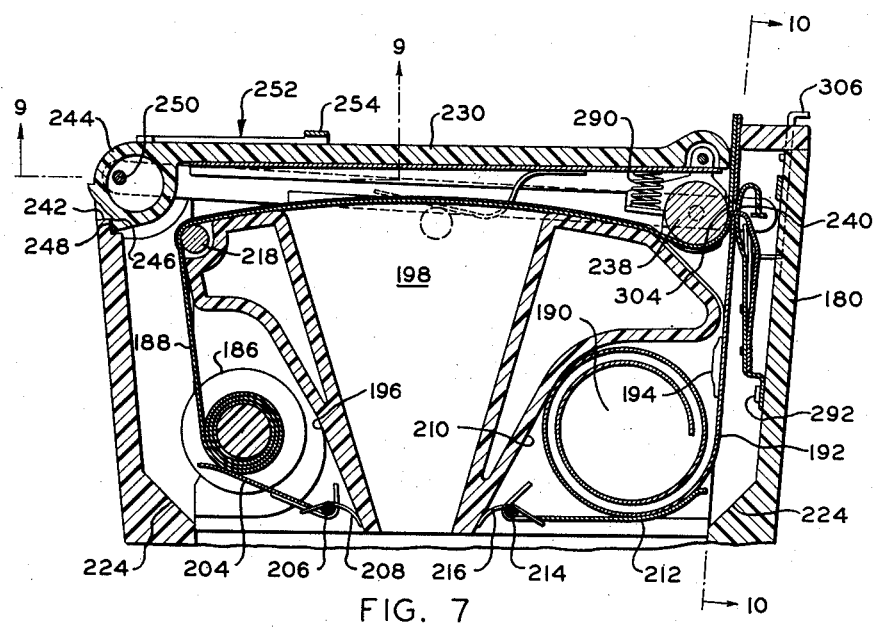
Fig. 7 is a sectional view taken along a line substantially midway between the top and bottom of the camera of Fig. 6, said camera being in closed position, with parts thereof not shown and parts thereof broken away.

The second roll 190 is supported in compartment 210, curved as shown in Fig. 7, and is retained in compartment 210 by plate 212. Plate 212 is rotatably supported on retainer pin 214, the ends of which are secured to said upper and lower plates 198. Plate 212 is urged into contact with second roll 190 by means of spring 216, also mounted on retainer pin 214.

First sheet 188, when the magazine 184 is in operating position within the camera of Fig. 6, extends from first roll 186 and is positioned in the focal surface of the camera lens. Positioning of first sheet 188 in said focal surface is accomplished by means of roller 218, which is tangent to said focal surface, and by means of guide surfaces 220 (Fig. 6) of upper and lower plates 198, which lie substantially in said focal surface. Compartments 196 and 210 and upper and lower plates 198 constitute the walls of a chamber, one end of which is normally adjacent the lens of the camera of Fig. 6 and the opposite end of which lies substantially within the focal surface of said lens. It is to be noted that compartment 196 is smaller in cross-sectional area than is compartment 210, this being so for the reason that first roll 186, which is adapted to be contained in compartment 196, is less bulky than is second roll 190, which is adapted to be contained in compartment 210.

Magazine 184 is secured in proper position within housing 180 in the following manner. Lugs 222, on upper and lower plates 198 (Fig. 6), which abut against the top and bottom walls of housing 180, prevent movement of magazine 184 perpendicularly to the top and bottom wall of housing 180. The forward end of magazine 184 is positioned by means of angular abutments 224 formed on housing 180. Magazine 184 is secured in proper position by means of lugs 226, on upper and lower plates 198, which are adapted to abut against leaf springs 228 mounted on closure means 230, now to be described.

The structure by which closure means 230 is pivoted to housing 180 embodies novel combined means for rendering housing 180 lighttight and, also, for bringing pressure member 238, which is mounted on the free end of closure means 230, into coaction with pressure member 240, which is mounted on a wall of housing 180.

The housing 180 is rendered lighttight by means of shoulder 246, on closure means 230, which abuts against baffle 248 of housing 180 when the closure means is in closed position. The rear edge of the side of housing 180, to which closure means 230 is pivoted, is cut away, as shown at 242 (Fig. 7), to provide space for the mounting of barrel 244 which forms an end of closure means 230. The smooth curve of the outer surface of barrel 244 is broken by the aforesaid shoulder 246, which extends along the entire length of barrel 244 and coacts with the aforesaid baffle 248, when closure means 230 is in closed position, to exclude light from within housing 180.

Figure 8:
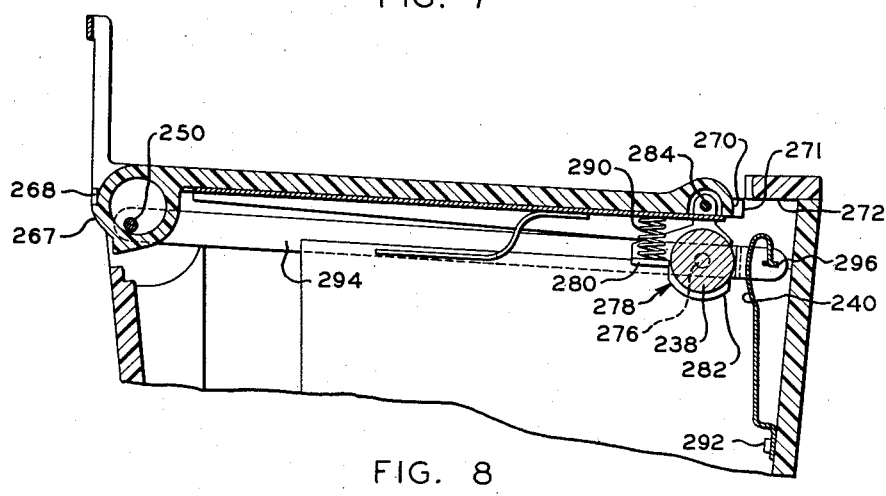
Fig. 8 is a sectional view taken along a line substantially midway between the top and bottom of the camera of Fig. 6, the free end of the closure means being disengaged, with parts of said camera not shown and parts thereof broken away.
Figure 9:
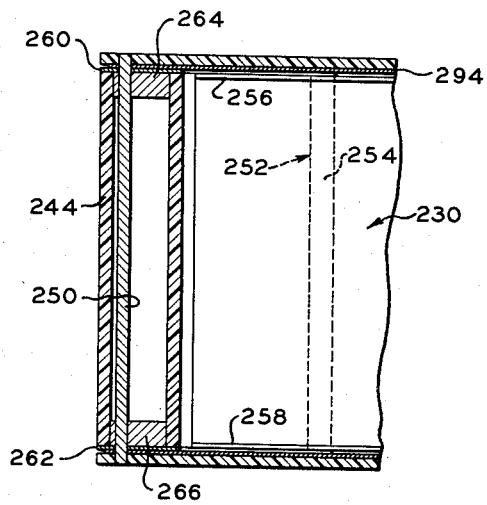
Fig. 9 is a sectional view of Fig. 7, taken substantially along the line 9—9.

The closure means 230 is rotatably mounted on housing 180 by means of an eccentric pivot, by which said closure means 230 may be both rotated about an axis into closed position and, also, moved perpendicularly to said axis to bring pressure member 238 into coaction with pressure member 240. Shaft 250 is secured at its ends to housing 180 and, as shown in Figs. 7, 8 and 9, extends from the top wall to the bottom wall of housing 180 through barrel 244. Barrel 244, shaft 250 and lever 252, which is trunnioned on shaft 250, coact to rotatably support closure means 230 and to lock closure means 230 in closed position with pressure member 238 in operating position against pressure member 240. Lever 252 comprises yoke 254 and legs 256 and 258, legs 256 and 258 being journaled on shaft 250 at 260 and 262, respectively. Legs 256 and 258 are respectively provided with circular bosses 264 and 266, said bosses being inserted into barrel 244 and serving to rotatably support closure means 230. The axis of rotation of circular bosses 264 and 266 is eccentric to the axis of rotation of shaft 250, whereby relative rotation of the closure means 230 and the lever 252 results in motion of the closure means 230 in a direction perpendicular to the axis of shaft 250. Lugs 267 are provided on the outer surface of barrel 244 and coact with lever shoulders 268 to open closure means 230 when lever 252 is rotated sufficiently outwardly.

The free end of closure means 230 is cut away, as at 270 (Fig. 8), lugs 271, one of which is shown in Fig. 8, being formed at each side of the cutaway portion. When the closure means 230 is in closed position, lugs 271 abut against and are held in place by ledge 272 and pressure member 238 is held in operating position against pressure member 240.

Thus, a simple and easily operated means for closing the passage in the back of housing 180 and actuating the pressure-applying members 238 and 240 is provided. To open closure means 230, starting from the closed position of Fig. 7, lever 252 is rotated away from the outer surface of closure means 230. By reason of the eccentric arrangement of barrel 244, circular bosses 264 and 266 and shaft 250, the closure means 230 moves longitudinally toward the side of housing 180 to which closure means 230 is pivoted and lugs 271 are disengaged from the inner surface of ledge 272. Upon continued rotation of lever 252, lever shoulders 268, which are integral with lever 252, abut against lugs 267 and closure means 230 is rotated outwardly from passage 182 in the back of housing 180. Conversely, the closure means 230 may be rotated to its position over passage 182, and the lever 252, when rotated toward closure means 230, carries the closure means into closed position with lugs 271 engaging the inner surface of ledge 272.

Closure means 230 mounts channel member 274 which braces closure means 230 and securely supports pressure member 238 at the free end of said closure means 230 (Fig. 8). Pressure member 238 is trunnioned at 276 on cradle 278. Cradle 278 comprises yoke 280 and legs 282, said legs 282 being pivoted to closure means 230, as at 284. A stop member 286 (Fig. 6) on each leg 282 limits movement of cradle 278, when closure means 230 is in open position, by contacting an abutment 288 on each side of channel member 274, one of said stop members and one of said abutments being shown in Fig. 6. Helical springs 290, at each end of yoke 280, normally urge pressure member 238 into engagement with pressure member 240.

Figure 10:
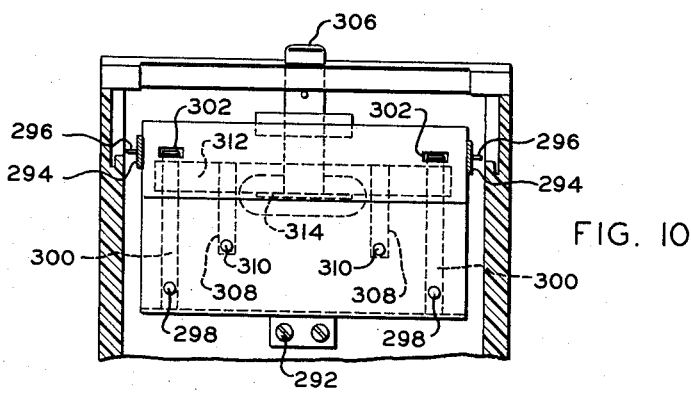
Fig. 10 is a sectional view of Fig. 7, taken substantially along the line 10—10, illustrating the second pressure member and the stop means for interrupting the exit of the first and second sheets from within the camera.

Pressure member 240 is resilient and is connected to housing 180, as at 292 (Fig. 10). Tension bars 294, one of which is shown in Figs. 7 and 8, extend along the inside surfaces of the top and bottom walls of housing 180 to reinforce said housing against the forces exerted by pressure members 238 and 240. One end of the tension bar 294 (Fig. 8) is connected to pressure member 240, as at 296, and the opposite end of said tension bar 294 is connected to shaft 250.

Figure 11:
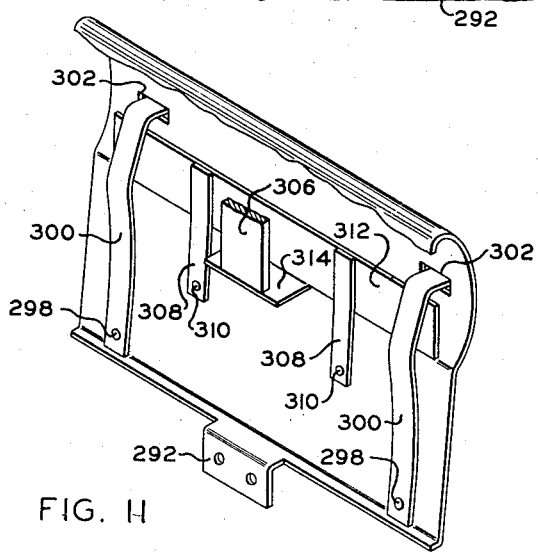
Fig. 11 is a perspective view of said stop means and second pressure member.

Referring now to Figs. 10 and 11, pressure member 240 mounts means by which exit of superposed first and second sheets from within housing 180 is interrupted to indicate that an image-receiving area of said first sheet has been brought into the focal surface of the camera. Spot welded or otherwise attached to pressure member 240, as at 298, are spring fingers 300. Spring fingers 300 extend through apertures 302 and are adapted to mesh with apertures 304 at opposite edges of said first and second sheets to interrupt exit of said first and second sheets from housing 180. It is apparent that only one of the first and second sheets, if desired, may be provided with apertures at its opposite edges. The spring fingers 300 may be disengaged from apertures 302 and 304 by means of a simple release mechanism actuated by push rod 306. Leaf springs 308 are spot welded or otherwise attached at their lower extremities to pressure member 240, as at 310. Cross bar 312, having lug 314 extending perpendicularly therefrom, is attached, as at 316, to the upper extremities of leaf springs 308. An inspection of Fig. 11 makes it apparent that a downward force on push rod 306 rotates cross bar 312 outwardly from pressure member 240 and withdraws spring fingers 300 from apertures 302 and 304.

In the operation of the camera of Figs. 7 through 11, closure means 230 is swung open and magazine 184 is removed from housing 180. A first roll 186 is snapped into position in compartment 196 and a second roll is inserted into compartment 210, as shown in Fig. 7. The first sheet 188 is drawn past roller 218 and into contact with guide surfaces 220 (Fig. 6), which position said first sheet 188 in the focal surface of the camera lens when said magazine 184 is in operating position within housing 180. The first and second sheets 188 and 192 then are aligned and superposed, as shown in Fig. 7. The magazine 184 then is inserted into housing 180, the superposed first and second sheets being held adjacent the pressure member 240 and extending through the passage 182 in the back of housing 180. Closure means 230 then is closed, the pressure member 238 thus being brought into coaction with pressure member 240 so that pressure is exerted on opposite sides of said superposed first and second sheets. As stated above, inasmuch as both first sheet 188 and second sheet 192 have opaque backing layers, no dark chamber external to pressure members 238 and 240 is necessary. The superposed first and second sheets may be drawn directly from the housing 180 outwardly between pressure members 238 and 240 until spring fingers 300 mesh with apertures 304 on opposite edges of said first and second sheets. An image-receiving area of said first sheet 188 is now in proper position for exposure. After exposure of said image-receiving area, push rod 306 is actuated to release spring fingers 300 from engagement with apertures 304 and once again the superposed first and second sheets are drawn between pressure members 238 and 240 until spring fingers 300 again snap into apertures 304. After a short predetermined processing time, the image-receiving area of said second sheet may be ripped from the remainder of said second sheet, being aided by perforations which separate said image-receiving area from the remainder of said second sheet and, at the same time, is peeled from the first sheet 188.

Although constructions of the apparatus described herein are believed to possess novel advantages, certain modifications thereof are considered within the scope of the present invention. One such modification contemplates an inner closure means which is stationary with respect to the remainder of the camera housing, and an outer closure means which is pivoted to the back of said housing, the inner and outer closure means forming a dark chamber therebetween. A first pressure member may be positioned either on the magazine or on the free end of the fixed inner closure means and means may be provided to release a second pressure member from contact with the first pressure member. Access to the interior of the housing may be provided through the top of said housing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera of the type wherein a first sheet of photosensitive material is exposed and thereafter processed in conjunction with a second sheet by means of a liquid processing composition spread between said sheets, said camera comprising a housing having a lens and shutter means mounted in one wall thereof, a magazine within said housing for supporting rolls of said first and second sheets, said housing having a passage for providing access to said magazine, said magazine being removable from said housing through said passage, said magazine having a cavity open at opposite ends, one of said ends lying adjacent said lens and the other of said ends providing at least one guide surface substantially in the focal surface of said lens whereby said first sheet may be exposed in said focal surface, and a pair of pressure-applying members associated with said housing, said first and second sheets being adapted to be superposed and drawn between said pressure-applying members, spreading of said processing composition being caused between said first and second sheets.

2. A camera of the type wherein a first sheet of photosensitive material is exposed and thereafter processed in conjunction with a second sheet by means of a liquid processing composition spread between said sheets, said camera comprising a housing having a lens and shutter means mounted in one wall thereof, a magazine within said housing, said magazine being removable from said housing, said magazine having a cavity open at opposite ends, means on said magazine on one of opposite sides of said cavity for rotatably supporting a roll of said first sheet, means on said magazine on the other of said opposite sides for rotatably supporting a roll of said second sheet, one of said ends lying adjacent said lens and the other of said ends lying substantially in the focal surface of said lens, whereby said first sheet may be exposed in said focal surface, and a pair of pressure-applying members associated with the said housing, said first and second sheets being adapted to be superposed and drawn between said pressure-applying members, spreading of said processing composition being caused between said first and second sheets.

3. A camera of the type wherein a first sheet of photosensitive material is exposed and thereafter processed in conjunction with a second sheet by means of a liquid processing composition spread between said sheets, said camera comprising a housing having a lens and shutter means mounted in one wall thereof, a magazine for carrying rolls of said first and second sheets, said housing having a passage in another wall thereof providing access to the interior of said housing, said magazine being removable from said housing through said passage, closure means for closing said passage when in closed position and for permitting movement of said magazine into and out of said housing when in open position, a pressure-applying member supported on a wall of said housing adjacent said passage, and another pressure-applying member supported on said closure means, said pressure-applying members being operatively juxtaposed when said closure means is in closed position, whereby when said closure means is in closed position said first and second sheets may be superposed and drawn between said pressure-applying members, said pressure-applying members causing spreading of said processing composition between said first and second sheets.

4. A camera of the type wherein a first sheet of photosensitive material is exposed and thereafter processed in conjunction with a second sheet by means of a liquid processing composition spread between said sheets, said camera comprising a housing having a lens and shutter means mounted in one wall thereof, a magazine for carrying rolls of said first and second sheets, said housing having a passage in another wall thereof providing access to the interior of said housing, said magazine being removable from said housing through said passage, closure means for closing said passage when in closed position and for permitting movement of said magazine into and out of said housing when in open position, a pressure-applying member supported on a wall of said housing adjacent said passage, and another pressure-applying member supported on said closure means, said pressure-applying members being operatively juxtaposed when said closure means is in closed position, one of said pressure-applying members being positioned substantially on one side of a plane perpendicular to the focal surface of said lens and the other of said pressure-applying members being positioned substantially on the other side of said plane, whereby when said closure means is in closed position said first and second sheets may be superposed and drawn between said pressure-applying members, said pressure-applying members causing spreading of said processing composition between said first and second sheets.

5. A camera of the type wherein a first sheet of photosensitive material is exposed and thereafter processed in conjunction with a second sheet by means of a liquid processing composition spread between said sheets, said camera comprising a housing having a lens and shutter means mounted in one wall thereof, said housing having a passage providing access to the interior of said housing, a magazine within said housing, said magazine having a cavity open at its opposite ends, one of said ends lying adjacent said lens and the other of said ends providing at least one guide surface substantially in the focal surface of said lens, said magazine being removable from said housing through said passage, means for closing said passage when in closed position and for permitting movement of said magazine through said passage when in open position, two rolls supported by said magazine, one of said rolls comprising a first sheet of photosensitive material and the other of said rolls comprising a second sheet which carries a processing composition, and a pair of pressure-applying members associated with said housing, said first sheet extending from its respective roll into contact with said guide surface and toward said pressure-applying members, said second sheet extending from its respective roll toward said pressure-applying members, said first sheet thence being superposed on said second sheet between said pressure-applying members so that when said superposed first and second sheets are drawn between said pressure-applying members said processing composition is caused to spread between said superposed first and second sheets.

6. A camera of the type wherein a first sheet of photosensitive material is exposed and thereafter processed in conjunction with a second sheet by means of a processing liquid spread between said sheets, said camera comprising a housing having a lens and shutter means mounted in one wall thereof, said housing having a passage in another wall thereof providing access to the interior of said housing, closure means for closing said passage when in closed position and for providing access to the interior of said housing when in open position, a magazine within said housing, said magazine including a first mounting means for holding a roll of said first sheet and a second mounting means for holding a roll of said second sheet, said magazine being operatively mounted in said housing, said magazine having a cavity therethrough, said cavity being open at its opposite ends, one of said ends lying adjacent said lens and the other of said ends lying substantially within the focal surface of said lens, and a pair of pressure members associated with said housing, one of said pressure members being mounted on said closure means, the other of said pressure members being mounted on a portion of said housing, one of said pressure members constituting a pressure roller, the other of said pressure members constituting a pressure plate, said pressure members being operatively juxtaposed when said closure means is in closed position and providing a space therebetween capable of receiving said first and second sheets in superposed relation, withdrawal of said sheets between said pressure members causing the release and spreading of the processing composition between the surfaces of said sheets.

7. A camera of the type wherein a first sheet of photosensitive material is processed in conjunction with a second sheet by means of a liquid processing composition spread between said sheets, said camera comprising a housing, said housing having a lens and shutter means in one wall thereof, a magazine within said housing for mounting rolls of said first and second sheets, said housing having a passage in another wall thereof, closure means for permitting removal of said magazine from said housing when in open position and for excluding light from the interior of said housing and securing said magazine within said housing when in closed position, said magazine being removable from said housing through said passage, and a pair of pressure-applying members associated with said housing, one of said members being positioned on said closure means and the other of said members being positioned on said housing, said pressure-applying members being operatively juxtaposed when said closure means is in closed position and providing a space therebetween capable of receiving said first and second sheets in superposed relation, withdrawal of said sheets between said pressure-applying members causing the release and spreading of the processing composition confined between said sheets.

8. The camera of claim 7 wherein said closure means comprises an inner closure means and an outer closure means, said inner and outer closure means when in closed position forming a dark chamber therebetween.

9. The camera of claim 7 wherein said closure means is rotatably mounted on an eccentric pivot.

10. A camera of the type wherein a first sheet of photosensitive material is processed in conjunction with a second sheet by means of a liquid processing composition spread between said sheets, said camera comprising a housing, said housing having a lens and shutter means in one wall thereof, a magazine within said housing, means on said magazine for rotatably mounting rolls of said first and second sheets, said housing having a passage in another wall thereof, inner closure means pivoted to one side of said passage, and outer closure means pivoted to the opposite side of said passage, said inner and outer closure means, when in closed position, excluding actinic light from the interior of said housing and overlapping to form between their adjacent surfaces a dark chamber, said dark chamber being capable of receiving said first and second sheets in superposed relation, said magazine being movable through said passage when said inner and outer closure means are in open position.

11. A camera of the type wherein a first sheet of photosensitive material is processed in conjunction with a second sheet by means of a liquid processing composition spread between said sheets, said camera comprising a housing having a lens and shutter means in one wall thereof, said housing having a passage in another wall thereof, a magazine within said housing for mounting rolls of said first and second sheets, inner closure means pivoted to one side of said passage, a first pressure member mounted on the free end of said inner closure means, a second pressure member mounted on said housing adjacent the opposite side of said passage, said first and second pressure members being operatively juxtaposed when said inner closure means is in closed position, and outer closure means pivoted to said opposite side of said passage, said inner and outer closure means, when in closed position, excluding actinic light from within said housing and overlapping to form between their adjacent surfaces a dark chamber, said dark chamber being capable of receiving said first and second sheets in superposed relation, said inner and outer closure means, when in open position, permitting removal of said magazine from the interior of said housing.

12. A camera of the type wherein a first sheet of photosensitive material is processed in conjunction with a second sheet by means of a liquid processing composition spread between said sheets, said camera comprising a housing having a lens and shutter means in one wall thereof, said housing having a passage in another wall thereof, a magazine within said housing for mounting rolls of said first and second sheets, closure means, first pivot means, second pivot means associated therewith, said closure means being operatively connected to said first pivot means for pivotal movement about a first center, said housing being operatively connected to said second pivot means for pivotal movement about a second center, said second center being eccentric to said first center, and a pair of pressure members associated with said housing, one of said pressure members being mounted on the free end of said closure means and the other of said pressure members being mounted on said housing adjacent the side of said passage opposite said one side whereby, when said closure means is in open position, access to the interior of said housing through said passage is provided and, when said closure means is in closed position, said passage is closed and the pressure members are operatively juxtaposed and capable of receiving therebetween said first and second sheets in superposed relation, withdrawal of said sheets between said members causing the release and spreading of said processing composition between said sheets.

13. A camera of the type wherein a first sheet of photosensitive material is processed in conjunction with a second sheet by means of a liquid processing composition spread between said sheets, said camera comprising a housing, said housing having a lens and shutter means in one wall thereof, said housing having a passage in another wall thereof, a magazine within said housing for mounting rolls of said first and second sheets, a first roll mounted on said magazine, said first roll comprising a sheet of photosensitive material, a second roll mounted on said magazine, said second roll comprising a second sheet which carries a liquid processing composition, said first and second sheets having backing layers opaque to actinic light, closure means rotatably mounted at one side of said passage on an eccentric pivot, and a pair of pressure members associated with said housing, one of said pressure members being mounted on the free end of said closure means and the other of said pressure members being mounted on said housing adjacent the side of said passage opposite said one side whereby, when said closure means is in open position, access to the interior of said housing through said passage is provided and, when said closure means is in closed position, said passage is closed and the pressure members are operatively juxtaposed and capable of receiving therebetween said first and second sheets in superposed relation, withdrawal of said sheets between said members causing the release and spreading of said processing composition between said sheets.

14. A camera of the type wherein a first sheet of photosensitive material is processed in conjunction with a second sheet by means of a liquid processing composition spread between said sheets, said camera comprising a housing, said housing having a lens and shutter means in one wall thereof, said housing having a passage in another wall thereof, a magazine within said housing for mounting rolls of said first and second sheets, closure means rotatably mounted at one side of said passage on an eccentric pivot, said eccentric pivot comprising a shaft secured at both ends thereof to said housing, a lever having legs, each of said legs being pivoted to said shaft, each of said legs having mounted thereon a boss, the axes of said bosses being eccentric to the axis of rotation of said shaft, said closure means including a barrel, said bosses being rotatable in said barrel, and a pair of pressure members associated with said housing, one of said pressure members being mounted on the free end of said closure means and the other of said pressure members being mounted on said housing adjacent the side of said passage opposite said one side whereby, when said closure means is in open position, access to the interior of said housing through said passage is provided and, when said closure means is in closed position, said passage is closed and the pressure members are operatively juxtaposed and capable of receiving therebetween said first and second sheets in superposed relation, withdrawal of said sheets between said members causing the release and spreading of said processing composition between said sheets.

15. A camera of the type wherein a first sheet of photosensitive material is processed in conjunction with a second sheet by means of a liquid processing composition spread between said sheets, said camera comprising a housing, said housing having a lens and shutter means in one wall thereof, a magazine, means on said magazine for rotatably mounting rolls of first and second sheets within said housing, said housing having a passage in another wall thereof, inner closure means pivoted to one side of said passage, and outer closure means pivoted to the opposite side of said passage, said inner and outer closure means, when in closed position, excluding actinic light from the interior of said housing and overlapping to form between their adjacent surfaces a dark chamber, said dark chamber being capable of receiving said first and second sheets in superposed relation, said inner and outer closure means, when in open position, being capable of providing access through said passage to the interior of said housing.

16. A camera of the type wherein a first sheet of photosensitive material is processed in conjunction with a second sheet by means of a liquid processing composition spread between said sheets, said camera comprising a housing having a lens and shutter means in one wall thereof, said housing having a passage in another wall thereof, a magazine within said housing and removable therefrom through said passage, means on said magazine for rotatably mounting a roll of said first sheet, means on said magazine for rotatably mounting a roll of said second sheet, inner closure means pivoted to one side of said passage, a first pressure member mounted on the free end of said inner closure means, a second pressure member mounted on said housing adjacent the opposite side of said passage, said first and second pressure members being operatively juxtaposed when said inner closure means is in closed position, and outer closure means pivoted to said opposite side of said passage, said inner and outer closure means, when in closed position, excluding actinic light from within said housing and overlapping to form between their adjacent surfaces a dark chamber, said dark chamber being capable of receiving said first and second sheets in superposed relation, said inner and outer closure means, when in open position, providing access to the interior of said housing.

17. A camera of the type wherein a first sheet of photosensitive material is processed in conjunction with a second sheet by means of a liquid processing composition spread between said sheets, said camera comprising a housing having a lens and shutter means in one wall thereof, said housing having a passage in another wall thereof, means for mounting first and second sheets within said housing, closure means, first pivot means, second pivot means associated therewith, said closure means being operatively connected to said first pivot means for pivotal movement about a first center, said housing being operatively connected to said second pivot means for pivotal movement about a second center, said second center being eccentric to said first center, and a pair of pressure members associated with said housing, one of said pressure members being mounted on the free end of said closure means and the other of said pressure members being mounted on said housing adjacent the side of said passage opposite said one side whereby, when said closure means is in open position, access to the interior of said housing through said passage is provided and, when said closure means is in closed position, said passage is closed and the pressure members are operatively juxtaposed and capable of receiving therebetween said first and second sheets in superposed relation, withdrawal of said sheets between said pressure members causing the release and spreading of said processing composition between said sheets.

18. A camera of the type wherein a first sheet of photosensitive material is exposed and thereafter processed in conjunction with a second sheet by means of a processing composition spread between said sheets, said camera comprising a housing having a lens and shutter means mounted in one wall thereof, a magazine within said housing, said magazine being removable from said housing and having a cavity open at opposite ends, one of said ends lying adjacent said lens and the other of said ends providing at least one guide surface substantially in the focal surface of said lens, means on said magazine on one side of said cavity for rotatably mounting a roll of first sheet, means on said magazine on the side of said cavity opposite said one side for rotatably mounting a roll of second sheet, whereby said first sheet may be exposed in said focal surface, and a pair of pressure-applying members associated with said housing, said first and second sheets being adapted to be superposed and drawn between said pressure-applying members, spreading of said processing composition being caused between said first and second sheets.

19. Photographic apparatus for processing a photosensitive sheet, said apparatus comprising a housing, said housing having a passage providing access to the interior thereof, a magazine, means on said magazine for rotatably mounting a roll of said photosensitive sheet, said magazine being movable into and out of said housing through said passage, closure means for closing said passage when in closed position and for permitting movement of said magazine into and out of said housing when in open position, a pressure-applying member supported on a wall of said housing adjacent said passage, and another pressure-applying member supported on said closure means, said pressure-applying members being operatively juxtaposed when said closure means is in closed position, whereby when said closure means is in closed position said photosensitive sheet may be drawn between said pressure-applying members, said pressure-applying members causing spreading of said processing composition over said photosensitive sheet.

References Cited in the file of this patent

UNITED STATES PATENTS

| Number | Name | Date |
|---|---|---|
| 2,256,981 | Klein | Sept. 23, 1941 |
| 2,455,111 | Carbone | Nov. 30, 1948 |